United States Patent Office 2,970,869
Patented Feb. 7, 1961

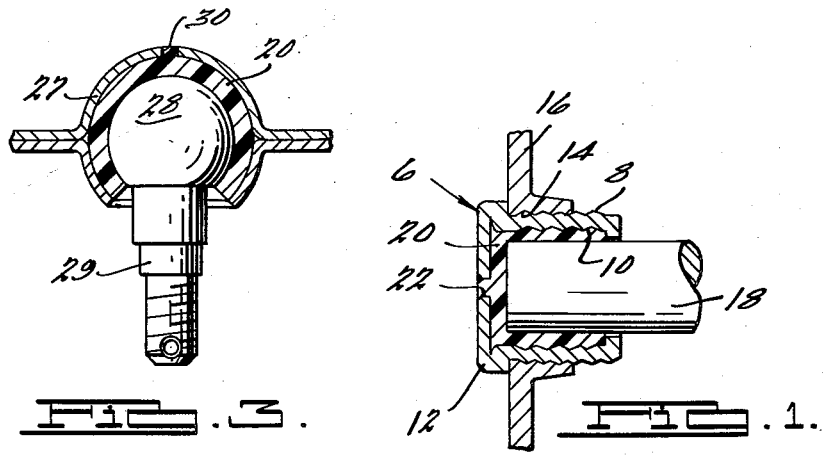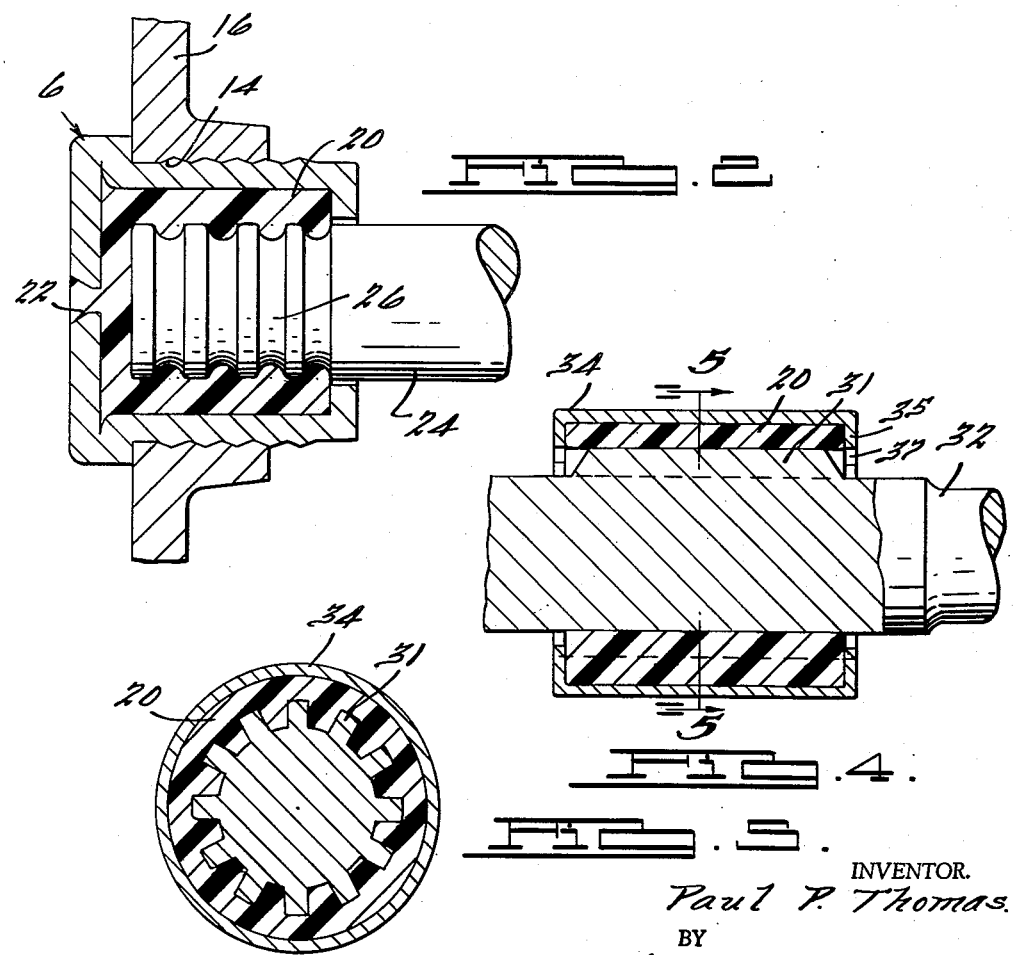

2,970,869

MOLDED BEARING

Paul P. Thomas, Detroit, Mich., assignor to American Metal Products Company, Detroit, Mich., a corporation of Michigan Filed Aug. 26, 1957, Ser. No. 680,293

1 Claim. (Cl. 308—238)

This invention relates to molded bearings and particularly to a bearing which can be molded directly about a member to provide both a rigid supporting structure and a bearing surface for the member.

It is one object of the invention to provide a bearing that can be molded directly about a member and hardened to form both a rigid backing and bearing surface for the member.

It is another object of the invention to provide a molded bearing of plastic that can be injected under pressure within a housing enclosing a member so that the plastic conforms to the member and hardens to form both a rigid supporting backing and a bearing surface for the member.

It is a further object of the invention to provide a plastic bearing that can be molded about a shaft in a manner to compensate for misalignment of the shaft.

It is a still further object of the invention to provide a bearing for ball joint applications comprising a plastic molded within a housing encircling the ball and conforming to the ball to provide both a rigid backing and bearing surface for the ball.

It is a still further object of the invention to provide a bearing that can be molded about a member to provide both a rigid backing and bearing surface which is economical, rugged and effective in use, and easy to make.

Other objects and features of novelty of the invention will be specifically pointed out or otherwise become apparent when referring, for a better understanding of the invention, to the following description taken in conjunction with the accompanying drawing, wherein:

Figure 1 is a broken sectional view of a bearing embodying features of the invention;

Fig. 2 is a broken sectional view similar to that of Fig. 1 illustrating another form of the invention;

Fig. 3 is a broken sectional view of a bearing illustrating still another form of the invention;

Fig. 4 is a broken sectional view of a bearing illustrating still another form of the invention; and Fig. 5 is a sectional view of the structure illustrated in Fig. 4, taken along the line 5—5 thereof.

Referring to Fig. 1, a bearing embodying features of the invention is comprised of a housing 6 having an external thread 8, internal thread 10 and a hexagonal head 12. The housing is screwed into an internally threaded aperture 14 in a leg 16 of an A-frame for supporting the front wheel of an automotive vehicle so as to enclose the end of a shaft 18 which serves as the cross arm for pivotally supporting the A-frame. The leg 16 is supported on the shaft 18 by a plastic 20 which, by way of example only, is injected within the housing 6 under pressure through an aperture 22 and hardened to provide both a backing and a bearing surface for the shaft. The other leg of the A-frame is similarly supported on the other end of the shaft 18 (not shown) and the shaft is rigidly secured to the chassis frame.

The plastic 20 can be any thermoplastic or thermosetting plastic having a desired low friction characteristic and a minimum amount of shrinkage after hardening. It may also be a combination of thermoplastic or thermosetting plastic, or a combination of either or both of these materials together with a filler material such as, for example, powdered material, macerated fabric or flocked material. If the plastic 20 is thermosetting, sufficient heat is applied after it is molded to harden it, and if it is thermoplastic, it will harden at room temperature.

Polyethylene molding compounds may be employed as the plastic 20, two being procurable on the market, one under the name of Super-dyland, the other under the name of Marlex. Phenolic impregnated glass fibrous material procurable in the trade under the name of Durez, and a form of nylon material, procurable on the market under the name of Zytel, can also be employed, as well as, a phenolic and polyethylene impregnated glass fibrous material.

However, it is to be understood that the above materials have been mentioned by way of example only and it is specifically intended that the invention not be limited by the particular plastic employed. The only requirement for the plastic 20 is that it have the desired design low friction characteristics and be thermosetting or thermoplastic so that it may be hardened after it is molded to provide both a rigid backing and bearing surface for supporting the leg 16 on the shaft.

Reference is made to the copending application of Charles S. White, Serial No. 619,782, filed November 1, 1956, now abandoned, and under which the assignee of the present invention is the exclusive licensee, for a description of the procedure and apparatus for molding the plastic 20 to a member. Although the analogous resin backing material employed in Figs. 5, 6 and 20 of the White case is used as a rigid backing for conforming a layer of Teflon to a member and not as a bearing surface, the molding principles employed are applicable to the present invention.

It will be observed in Fig. 1 that the plastic 20 conforms to the internal thread 10 so that it cannot move axially relative to the housing 6. As an alternative, the inner surface of the housing can be roughened, or suitable recesses provided therein to mechanically lock the plastic to the housing, or the plastic 20 can be bonded to the housing by a suitable bonding material to prevent its movement relative to the housing. By molding the plastic 20 about the end of a shaft 18, the shaft need not be in coaxial alignment with the housing 6 or aperture 14 since any slight displacement or misalignment of the shaft is readily compensated for by virtue of the molded construction. Further, the molded construction obviates the need for maintaining the close tolerances for the diameters of the shaft and the bearing which are required when the bearing is made as a separate element. Thus the present invention provides a significant reduction in cost.

Referring to Fig. 2, another form of the invention is illustrated wherein the end of a shaft 24 has a plurality of annular grooves 26 therein and the plastic 20 completely fills the grooves. This construction not only provides a rigid backing and bearing for rotatably supporting the leg 16 upon a shaft 24 but also restrains the leg 16 against lateral movement. It will be observed that the housing 30 has a radially inwardly projecting portion 32 for preventing axial movement of the plastic relative to the housing.

Of course, although Figs. 1 and 2 illustrate a bearing for the end of a shaft, it is apparent that the shaft could extend through the housing so that the plastic 20 would be molded in the form of a sleeve bearing for the shaft intermediate its ends.

As illustrated in Fig. 3, the molded bearing of the present invention is equally well suited to ball joint applications wherein a split housing 27 is disposed over a ball 28 on the end of a stud 29, and the low friction plastic 20 is injected through an aperture 30 in the housing and hardened to conform to the ball to provide a rigid backing and bearing surface for the ball. Reference is again made to the aforesaid copending application of Charles S. White for a description of the procedure for molding the plastic 20 within the housing 27.

When the plastic 20 is applied to the ball, the ball preferably has a rust resisting surface which may be produced by any conventional method, such as, by plating chromium thereon to retain the high polish, or which may be a surface of low friction material secured to the Teflon applied in a manner as illustrated, described and claimed in the application of Charles S. White, Serial No. 583,657, filed May 9, 1956, now abandoned, and under which the assignee of the present invention is the exclusive licensee, for Metal Bearing Having a Low Friction Resin Surface. When employing the rust resisting polished surface on the ball a seal normally employed with such ball joint assemblies may be eliminated.

Referring to Figs. 4 and 5, another form of the invention is illustrated wherein a housing 34 encircles splines 31 of a shaft 32 and the plastic 20 is injected within the housing 34 to conform to the splined portion. By this construction, the housing 34 can be fixed against rotation by suitable means (not shown) so that the shaft 32 is supported in a manner that prevents its rotation but permits it to move axially on the bearing surface provided by the low friction plastic 20.

Ends 35 of the housing 34 have teeth-like portions 37 which project between the splines 31 to help confine the plastic when it is molded. The portions 37 also help to prevent the plastic 20 from moving axially relative to the housing 34, and the inner surface of the housing may be roughened or recessed, as previously described, to mechanically lock the plastic to the housing, or the plastic may be bonded to the housing by any suitable bonding material to prevent its rotation relative to the housing.

When the plastic 20 is bonded to the housing, the bonding material used is, of course, one that will bond both to the housing and to the plastic. Therefore, the particular bonding material selected will depend on the plastic 20 that is being used, as well as, the metal of the housing, the selection of a suitable bonding material being well within the ability of those skilled in the art. To bond the plastic to the housing, the bonding material can be conventionally applied to the inner surface of the housing as a primer coat and the housing heated to bond the primer coat thereto. When the heated plastic 20 is injected within the housing under pressure, it will bond itself to the primer coating.

However, due to the fact that the plastic 20 is injected within the housing under heat and pressure, it is admirably suited to bonding the primer coat to the housing, as well as, bonding itself to the primer coating to eliminate the need of a separate step of bonding the primer coat to the housing. Consequently, the primer coat may be simply sprayed, brushed, or otherwise appled to the inner surface of the housing, and only the heat and pressure of the injected plastic utilized to bond the materials together so that the plastic is prevented from moving relative to the housing.

From the foregoing description it will be appreciated that the present invention provides a molded bearing which is very economical and easy to make, and is extremely useful for a variety of applications where the low friction characteristics of the plastic 20 are acceptable for the particular bearing application.

What is claimed is:

A molded bearing for pivotally connecting the leg members of an A-frame to a cross shaft of an automotive vehicle comprising a leg member having an enlarged aperture therein, an annular housing secured within said aperture having an end wall enclosing one end thereof and an inwardly directed flange defining an aperture in the other end thereof, an aperture in said end wall for injecting plastic material into said housing, a cross shaft having one end thereof extending within the housing through the aperture in the end of the housing with the end thereof spaced from said end wall, the portion of the end of the cross shaft within said housing having a plurality of annular grooves therein, and plastic material within the housing and about said portion of the shaft so as to completely fill the housing and the annular grooves in the shaft to provide a rigid backing and bearing surface for the shaft.

References Cited in the file of this patent

UNITED STATES PATENTS

| | | |
|---|---|---|
| 1,881,601 | Hufferd et al. | Oct. 11, 1932 |
| 2,307,874 | Bilde | Jan. 12, 1943 |
| 2,343,205 | Pudelko | Feb. 29, 1944 |
| 2,459,598 | Stott | Jan. 18, 1949 |
| 2,535,436 | Maynard | Dec. 26, 1950 |
| 2,697,010 | Herschmugl | Dec. 14, 1954 |
| 2,738,551 | Howald | Mar. 20, 1956 |
| 2,804,886 | White | Sept. 3, 1957 |
| 2,815,253 | Spriggs | Dec. 3, 1957 |
| 2,847,712 | Pollard | Aug. 19, 1958 |

FOREIGN PATENTS

| | | |
|---|---|---|
| 217,681 | Great Britain | June 26, 1924 |